United States Patent [19]
Gronemeyer

[11] Patent Number: 6,044,105
[45] Date of Patent: Mar. 28, 2000

[54] DOPPLER CORRECTED SPREAD SPECTRUM MATCHED FILTER

[75] Inventor: Steven A. Gronemeyer, Cedar Rapids, Iowa

[73] Assignee: Conexant Systems, Inc., Newport Beach, Calif.

[21] Appl. No.: 09/145,055

[22] Filed: Sep. 1, 1998

[51] Int. Cl.[7] .................................................. H04B 1/69
[52] U.S. Cl. ........................ 375/207; 375/208; 375/343; 708/314
[58] Field of Search ........................... 375/200, 207–210, 375/343; 708/314; 342/99–101, 378

[56] References Cited

U.S. PATENT DOCUMENTS

| | | | |
|---|---|---|---|
| 4,894,842 | 1/1990 | Broekhoven et al. | 375/200 |
| 5,623,485 | 4/1997 | Bi | 370/209 |
| 5,640,431 | 6/1997 | Bruckert et al. | 375/344 |
| 5,734,674 | 3/1998 | Fenton et al. | 375/207 |
| 5,917,829 | 6/1999 | Hertz et al. | 370/349 |

*Primary Examiner*—Amanda T. Le

[57] ABSTRACT

A method and apparatus for a spread spectrum matched filter with Doppler correction suitable for using in a radio frequency receiver. A principal idea of the invention is to reduce a waveform representing Doppler correction values into a simple Boolean combination that can simply represent the waveform and be built into the processing in the matched filter. Advantages are (1) faster use of the matched filter, resulting in faster signal acquisition, and (2) lower power consumption because clocking to load signal and/or Doppler correction values is reduced. In particular, received samples can be Doppler corrected for the nominal or mean Doppler shift plus local oscillator error as they are stored. The remaining Doppler shift is relatively small and can be removed by building a relatively few Doppler offsets into the processing logic for each matched filter tap. This saves time because the Doppler shift can be changed almost instantly. It saves power because new signal or Doppler signals do not need to be shifted or scanned into the matched filter.

14 Claims, 6 Drawing Sheets

DOPPLER CORRECTED SPREAD SPECTRUM MATCHED FILTER

TECHNICAL FIELD

This invention relates to electronic communication systems, and more particularly to a spread spectrum matched filter with Doppler correction suitable for using in a radio frequency receiver.

BACKGROUND

Conventionally, data communication systems have used narrow band modulation techniques, such as amplitude modulation, frequency modulation, and binary phase shift keying. With such systems, demodulation at the receiver can be achieved with a relatively small amount of circuitry. Such systems, however, suffer from several problems, including multipath fading and narrow band noise.

By contrast, in spread spectrum communication systems, a data spectrum is spread by a pseudo-noise code ("PN code") at a transmitter, while the PN code and the data are synchronized at a receiver so that the adverse effects of multipath fading and narrow band noise can be reduced. The characteristics of spread spectrum communication systems also have been used by the military to combat intentional jamming of radio and satellite communication links or to make it difficult to detect such transmitted signals. Accordingly, spread spectrum communication systems have attracted increased attention as a promising technique for radio frequency transmission of binary data.

The PN code typically is defined by a binary sequence and is often referred to as the "chip sequence". The binary symbols in the chip sequence are referred to as chips and it is assumed that the transmitter and intended receiver both have available the same chip sequence.

One of the two most common spread spectrum techniques called frequency hopping uses the chip sequence to shift over a wide bandwidth the carrier frequency of a conventional narrow band transmitter signal. The other common technique, called direct sequence spreading, directly multiplies a conventional narrow band signal by the chip sequence where the chip rate typically is much higher than the data rate. In both of these common spread spectrum techniques, a conventional narrow bandwidth communications signal can be viewed as a carrier which is frequency modulated or directly multiplied by the chip sequence. There are other types of spread spectrum systems including combinations of these two basis types in one system.

Spread spectrum signals may allow more than one transmission signal in the same frequency and time interval where each such signal uses a different chip sequence. This technique is called code division multiple access (CDMA). One application of Direct Sequence CDMA (DS-CDMA) is the Global Positioning System (GPS), which uses DS-CDMA to broadcast time and position data to receivers, which can use such signals to determine position and navigation information.

The subject of spread spectrum communications is given in a three book series by Marvin K. Simon, Jim K. Omura, Robert A. Scholtz, and Barry K. Levitt, *Spread Spectrum Communications,* Volume I, II, and III, Rockville, Md.: Computer Science Press, 1985. See also Robert A. Scholtz, *The Origins of Spread-spectrum Communications,* IEEE Transactions on Communications, COM 30, pp. 822–854, May 1982; Rober A. Scholtz, *Notes on Spread-spectrum History,* IEEE Transactions on Communications, COM-31, pp. 82–84, January 1983; and Robert Price, *Further Notes and Anecdotes on Spread Spectrum Origins,* IEEE Transactions on Communications, COM 31, pp. 85–97, January 1983.

Since the spectrum of the information signal in a spread spectrum system is spread by a PN code having a broader spectrum width, in order to correctly restore the information signal, it is necessary to synchronize the demodulation PN code generated at the receiving side with the modulation PN code generated at the transmitting side. Proper phase synchronization is typically achieved when the received spread spectrum signal is accurately timed in both its spreading PN code pattern position and its rate of chip generation. The phase synchronization process typically is accomplished in two stages: an initial synchronization process for finding a synchronous phase, and a process for tracking the detected phase. Known techniques for attaining the initial synchronization depend upon both analog and digital sliding correlators, matched filters and other devices.

In a conventional matched filter spread spectrum receiver, the receiver includes a radio frequency (RF) section for receiving the spread spectrum signal having a PN code modulated therein. The receiver converts the received spread spectrum signal into an intermediate-frequency (IF) signal. An in-phase converter and a quadrature-phase converter convert the IF signal into an in-phase (I-channel) spread signal and a quadrature-phase (Q-channel) spread signal. A PN code sync device de-spreads the received PN code modulated from the spread spectrum signal by synchronizing a reference PN code with the received PN code and maintaining the two codes in fine synchronism using, for example, a pair of correlators or a tracking loop based on a matched filter. A data demodulator demodulates the spread spectrum signal into the original baseband signal. The use of a matched filter has an advantage in that the transmitted coded signal can be acquired relatively quickly even with relatively large initial errors between the locally generated PN code and the received PN code.

In a DS-CDMA system such as a GPS receiver, a matched filter can be used to receive signals from multiple transmitters using a single set of receiver samples. However, each signal has a different PN code and a different amount of Doppler shift. If the receiver samples are Doppler corrected before being stored in the matched filter, either new signal samples or new Doppler correction samples have to be created and used for each desired signal to be received. This lowers the rate at which the matched filter can be used and also increases the power consumption of the receiver due to the filter loading process.

Accordingly, the inventor has determined that it would be useful to have a Doppler corrected spread spectrum receiver that avoids the limitations of the prior art, and in particular such a receiver that is low power and fast. The present invention provides such a system.

SUMMARY

The invention includes a spread spectrum matched filter with Doppler correction suitable for using in a radio frequency receiver. In one aspect, the invention includes a circuit for implementing a spread spectrum matched filter with Doppler correction, the circuit including a storage circuit configured to receive and store an input sample of a complex signal to be Doppler shift corrected and correlated to a code signal; a Doppler shift generator for generating a Doppler shift correction value; a complex mixer, coupled to the storage circuit and the Doppler shift generator, for mixing at least a portion of the input sample with a Doppler shift correction value from the Doppler shift generator; a complex product generation circuit, coupled to the complex mixer and a code signal input, for computing the complex product of the mixed portion of the input sample with a current code phase of the code signal; a summing circuit, coupled to the complex product generation circuit, for summing the computed complex products as a current complex integration value; a square root circuit, coupled to the summing circuit, for computing the square root value of the sum of the squares of the current complex integration value, each square root value having a magnitude and an associated code phase; an output processing circuit, coupled to the square root circuit, for processing a plurality of computed square root values, wherein the code phase and magnitude of the computed square root value having the largest magnitude indicates a correlation between the input sample and the code signal, corrected for Doppler shift.

A principal idea of the invention is to reduce a waveform representing Doppler correction values into a simple Boolean combination that can simply represent the waveform and be built into the processing in the matched filter. Advantages are (1) faster use of the matched filter, resulting in faster signal acquisition, and (2) lower power consumption because clocking to load signal and/or Doppler correction values is reduced. In particular, received samples can be Doppler corrected for the nominal or mean Doppler shift plus local oscillator error as they are stored. The remaining Doppler shift is relatively small and can be removed by building a relatively few Doppler offsets into the processing logic for each matched filter tap. This saves time because the Doppler shift can be changed almost instantly. It saves power because new signal or Doppler signals do not need to be shifted or scanned into the matched filter.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4b is a state machine diagram for the state machine shown in FIG. 4a.

Like reference numbers and designations in the various drawings indicate like elements.

DETAILED DESCRIPTION

The invention includes a spread spectrum matched filter (MF) with Doppler correction suitable for using in a radio frequency receiver. The preferred embodiment of the invention is particularly suitable for using in a GPS radio frequency receiver. The MF subsystem serves two primary applications. In a normal navigation application, the MF subsystem described below can output code phase information that allows a signal processing tracking loop to directly acquire prepositioning data for a GPS satellite. The MF subsystem may then be used when needed to support reacquisition and anti-multipath operations. In a single fix application, the MF subsystem can provide the only data required—the signal processing channels are not used. The invention also may be used in conjunction with other spread spectrum radio receivers.

System Architecture

Figure 1:
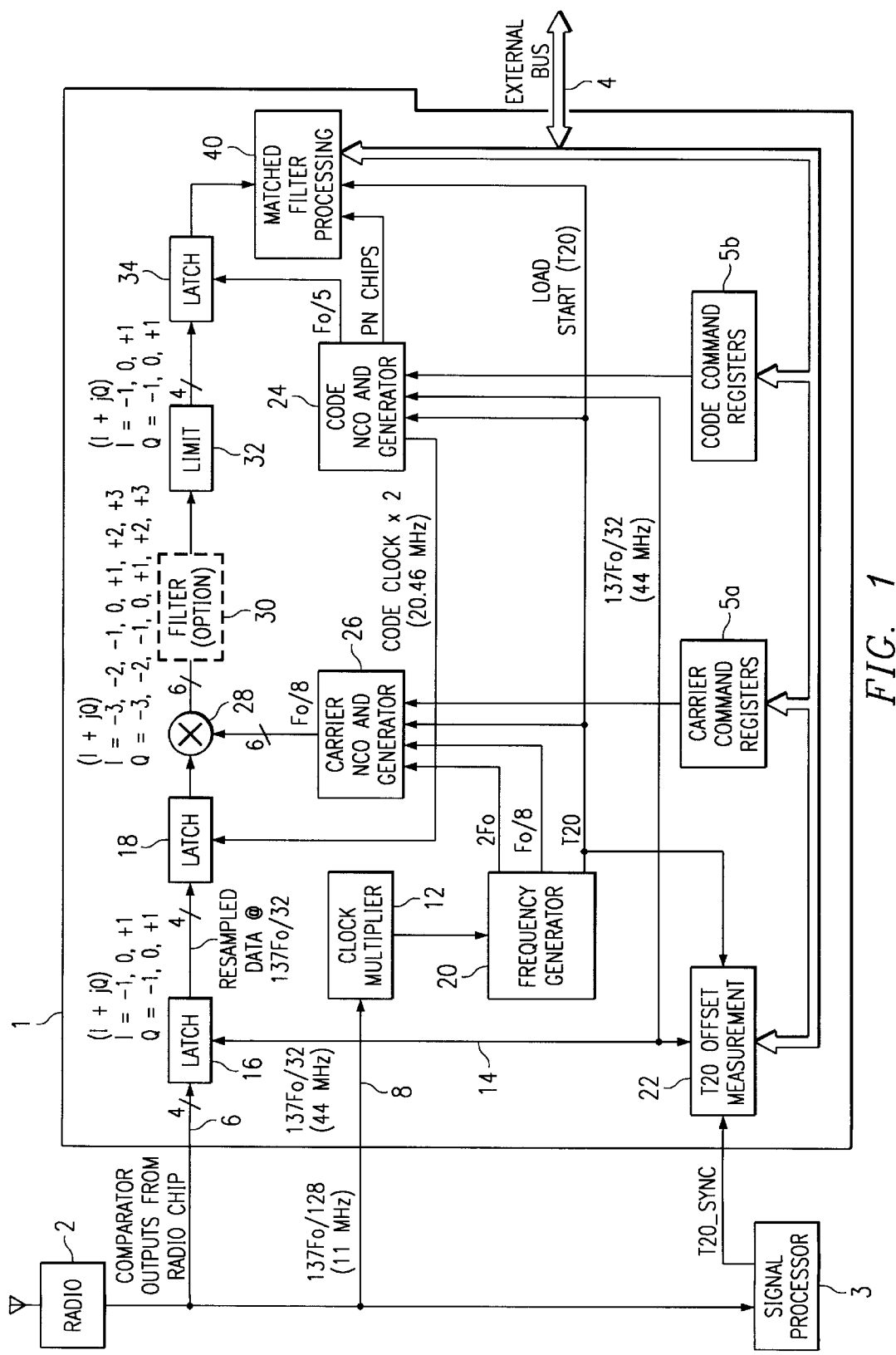
FIG. 1 is a block diagram showing the general architecture of one embodiment using a Doppler corrected matched filter subsystem in accordance with the invention.

FIG. 1 is a block diagram showing the general architecture of one embodiment using a Doppler corrected matched filter in accordance with the invention. Such a system may be utilized in various contexts, such as in communications or navigation applications. In the illustrated embodiment, a Doppler corrected matched filter subsystem 1 is coupled to a conventional spread spectrum radio frequency (RF) receiver section 2 and a signal processor 3. The illustrated matched filter subsystem 1 has an interface to an external bus 4 over which it may receive commands (for example, in a carrier command register set 5a and/or a code command register set 5b) and provide output results. The illustrated matched filter subsystem 1 may be integrated into a receiver system, or may constitute a separate device.

The RF receiver section 2 converts a received spread spectrum signal into an intermediate-frequency (IF) signal and then converts the IF signal into an in-phase I signal and a quadrature-phase Q signal 6. In the illustrated embodiment, the I and Q signals are each represented as 2-bit binary values in the range of −1, 0, and +1. The RF receiver section 2 also provides a clock signal 8 to the matched filter subsystem 1. In a GPS DS-CDMA system, the fundamental frequency Fo is 10.23 MHz. This fundamental frequency is converted to the clock signal 8 having a frequency of Fo*137/128 (about 11 MHz), which is coupled to the matched filter subsystem 1. The signal processor 3 also receives the I and Q signals 6 and clock signal 8 from the RF receiver section 2, and may have control signals coupled to the RF receiver section 2, in known fashion.

The RF receiver section 2 may be, for example, a "Gemini/Pisces Monopack" R6732-13 integrated circuit available from Rockwell Semiconductor Systems. The signal processor 3 may be, for example, a "Scorpio" 11577-11 integrated circuit available from Rockwell Semiconductor Systems.

In the preferred embodiment of the matched filter subsystem 1, input processing receives an input sample stream, reduces the sampling rate, and stores 20 ms worth of the resulting samples. The illustrated design reduces the data sampling rate to about 2.046 MHz and stores complex samples, each represented by a three level I sample and a three level Q sample. As a part of the sample rate reduction, the received samples go through a complex mixing process to remove an Fo/8 IF frequency, plus any desired offset frequency due to estimated error in the frequency standard or to Doppler shift. The 20 ms period during which the samples are taken begins at a T20 epoch, so that the correlation values output by the matched filter subsystem 1 may be related in time to the code phase settings of the various signal processing channels. In particular, the matched filter subsystem 1 uses the stored samples multiple times to calculate the cross correlation values between the received samples and several combinations of PN codes and Doppler shifts. The results of these operations are then supplied to a microprocessor controller (which may be part of the signal processor 3) via the external bus 4.

More particularly, in the illustrated matched filter subsystem 1, a clock multiplier 12 generates a 44 MHz clock signal 14 from the input 11 MHz clock signal 8. The 44 MHz clock signal 14 is applied to a first latch 16 to resample the I and Q signals 6. The resampled 44 MHz data is then applied to a second latch 18. The 44 MHz clock signal 14 is also applied to a frequency generator 20 which generates output frequencies of 2Fo (20.46 MHz); Fo/8 (1.28 MHz); and a local 20 ms epoch marker clock T20.

The local T20 epoch can be synchronized to the T20 epoch of the signal processor 3. Alternatively, the offset between a local T20 clock and an input synchronization reference T20_Sync could be measured in a comparator 22 against the 44 MHz clock signal 14. The comparator 22 provides a T20 offset measurement output signal over the bus 4.

The received samples in the second latch 18 are resampled at 2Fo (20.46 MHz) generated from a code frequency numerically controlled oscillator (NCO) and generator 24 in a manner similar to a normal DS-CDMA signal processing channel. A carrier frequency NCO and generator 26 is used to perform a complex multiply of the output of the second latch 18 through a multiplier 28 by the IF frequency Fo/8, plus an estimated frequency error. The complex multiply illustrated preferably uses the same 7 level mixing as is used in a conventional signal processing channel, resulting in an output range for each of the I and Q signals of −3 to +3, represented in 6 bits. The output of the mixing stage may then be applied to an optional anti-aliasing filter 30 to limit the bandwidth of the signal to no more than twice the sample rate of a third latch 34 downstream from the filter 30. In a preferred embodiment, the filter 30 provides a sliding average of 20 of the input samples to the filter 30.

The processed signal is then applied to a limiter 32 which limits the range of binary values to −1, 0, and +1, represented in 2 bits each for the I and Q signals, to reduce the amount of data that needs to be stored for 20 ms of signal samples. The limited, mixed signal is then resampled through a third latch 34 by an Fo/5 (2.046 MHz) clock from the code frequency NCO and generator 24 to reduce the amount of data that needs to be stored for 20 ms of signal samples. The code frequency NCO and generator 24 can also be used to provide a desired PN code (chips) to a matched filter processor 40 (described in further detail below).

Note that the provision of both a carrier NCO/mixer and a code NCO/sampler allows independent correction for a pure frequency shift in the former and of a Doppler shift to both carrier and code in the latter.

The limiting and down-sampling of the mixed signal to save storage space does result in a reduction in performance. In alternative embodiments, such processing may not be necessary or desirable.

Figure 2:
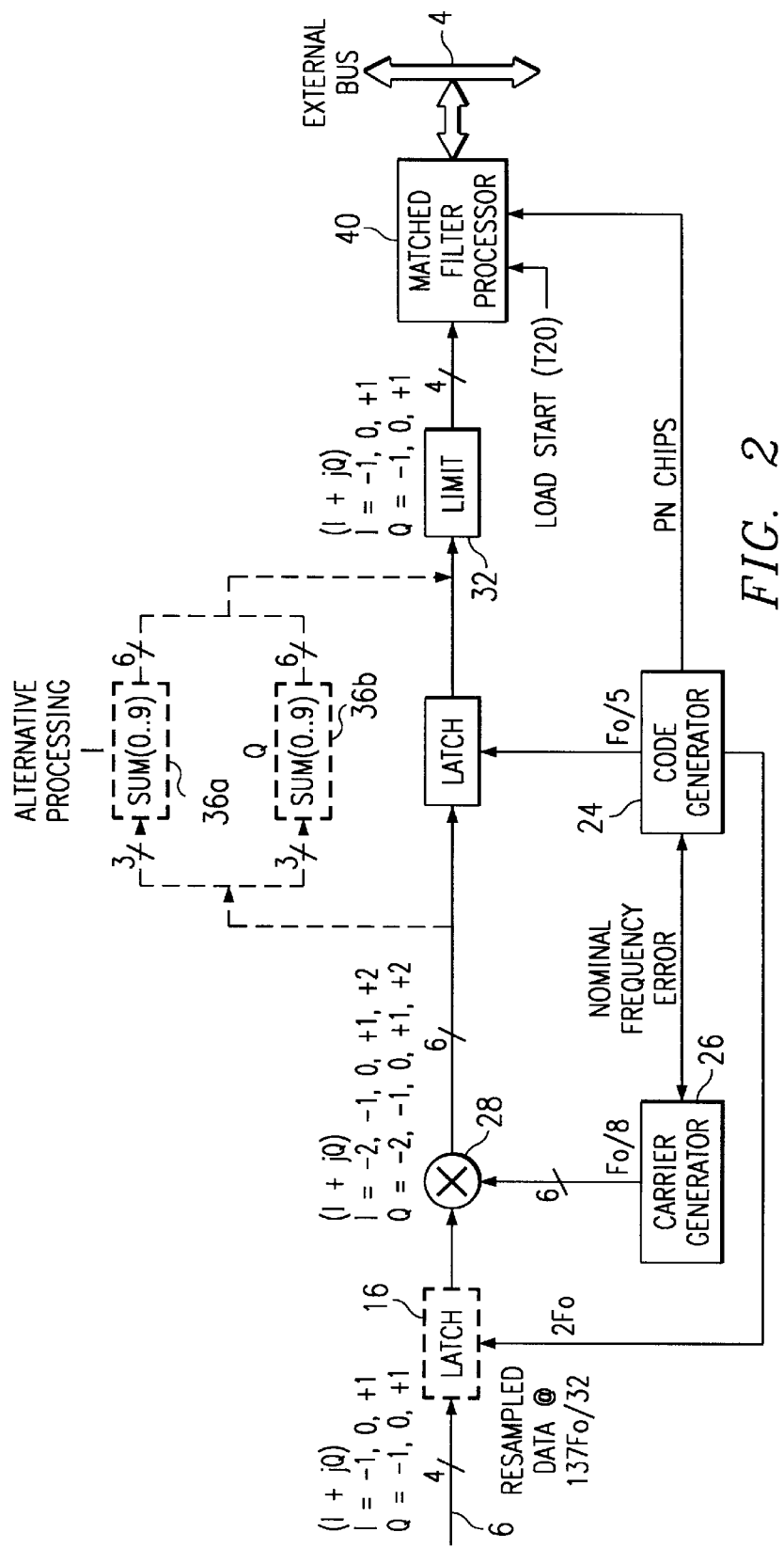
FIG. 2 is a block diagram of an alternative Doppler corrected matched filter subsystem in accordance with the invention.

FIG. 2 is a block diagram of an alternative Doppler corrected matched filter subsystem in accordance with the invention. In this embodiment, the incoming I and Q signals 6 are resampled through the first latch 16 at Fo and then subjected to 5 level mixing. Limiting is shown as occurring after the third latch 34. An alternative approach is shown in dotted outline, in which a filtering operation through two summing registers 36a, 36b is used to reduce the sample rate by a factor of ten, rather than resampling by means of the third latch 34. This filtering scheme is relatively simple to implement, but may be considered sub-optimal because it is only matched to half a chip duration (10 samples rather than 20).

In both FIGS. 1 and 2, the filtering shown before the sample rate reduction and amplitude limiting operations is fairly important for best performance. Without it, there is a loss of performance on the order of 3–4 dB. Either of the filtering alternatives suggested avoids most of this loss. The chip matched filter suggested in the discussion of FIG. 1 is closer to an optimum filter, since it is more closely matched to the chip waveform. The net effect of the filtering, then, is to allow sample rate reduction, and a correspondingly smaller sample storage RAM, while avoiding the loss due to sample rate reduction without the appropriate bandwidth limiting beforehand.

Matched Filter Processing

Figure 3:
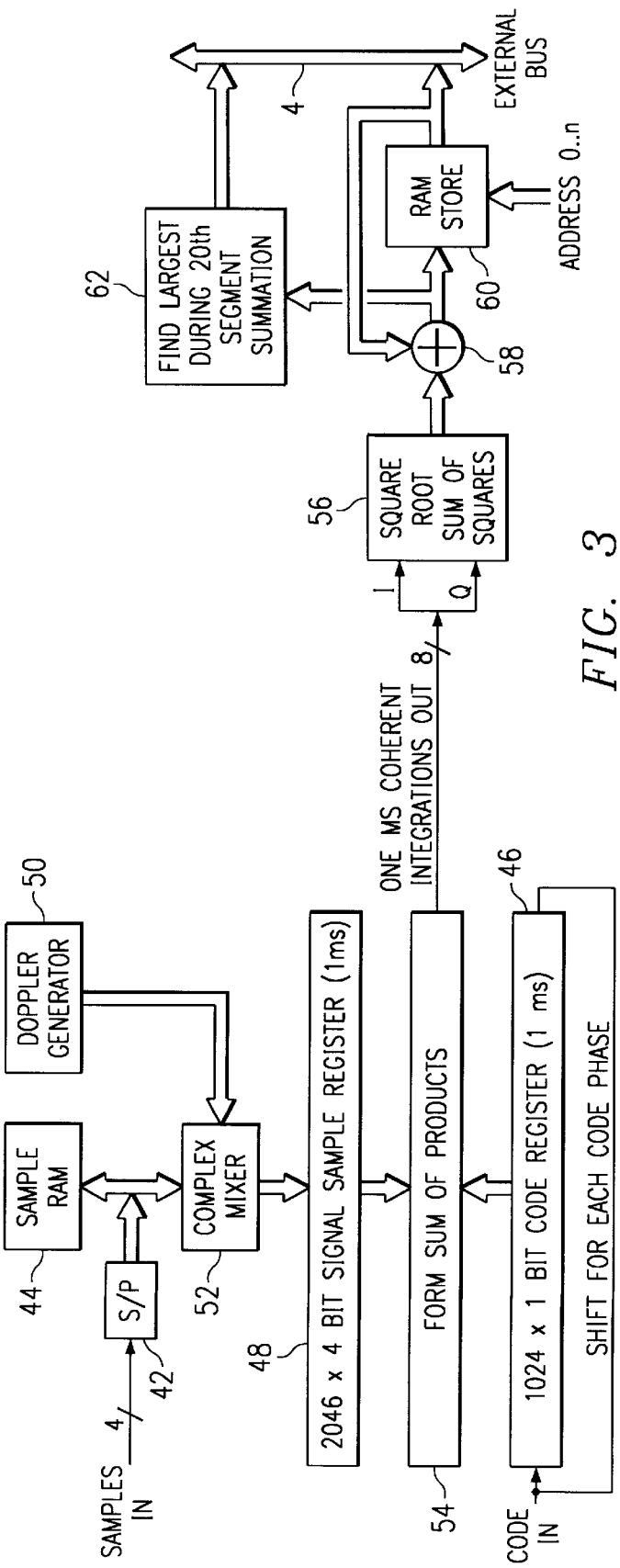
FIG. 3 is a block diagram of one embodiment of a Doppler corrected matched filter in accordance with the invention.

Once the received samples are resampled and limited, they are stored in the matched filter processor 40 for repeated processing. FIG. 3 is a block diagram of one embodiment of a Doppler corrected matched filter processor 40 in accordance with the invention. In the illustrated example, the samples are shown as being converted by a serial to parallel convertor 42 and stored in a sample RAM 44. A reasonable choice would be a 16-bit wide RAM. With 4-bit (complex) input samples, the data might be stored as 4 samples for each 16-bit word.

As noted above, in the preferred embodiment, 20 ms of data samples are stored in the RAM 44. However, in the preferred embodiment, the data is processed in 1 ms segments, corresponding to the period of a GPS PN code. Each 1 ms period will have 2046 4-bit (complex) signal samples and 1023 PN code chips, or 2 received samples per PN code chip. The PN chips may be loaded in serially into a PN code register 46. The loading process is only required at the point where a new PN code is required. As each 1 ms segment from the RAM 44 is about to be processed, it is pre-multiplied by a Doppler shifting circuit and then stored in a signal sample register 48. The Doppler shifting circuit comprises a Doppler generator 50 and a complex mixer 52.

Figure 4A:
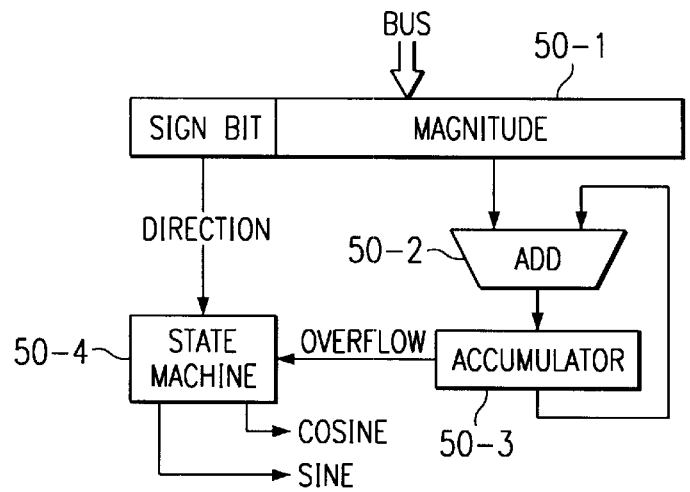
FIG. 4a is a block diagram of a conceptual implementation of a Doppler generator that may be used with the invention.
Figure 4B:
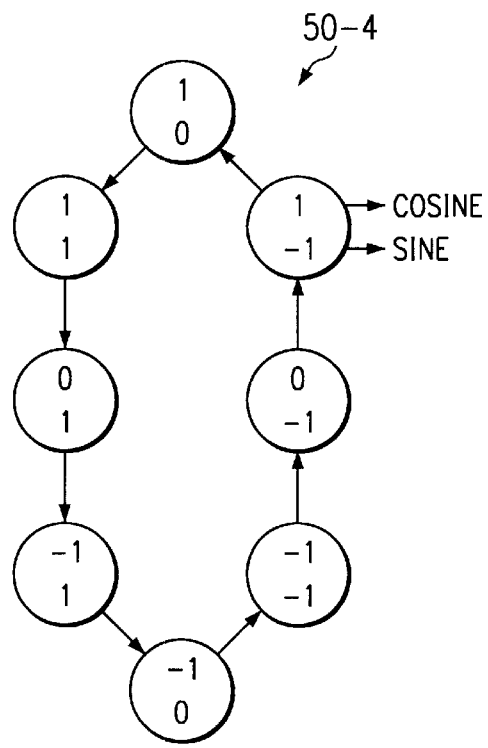

FIG. 4a is a block diagram of a conceptual implementation of a Doppler generator 50 that may be used with the invention. The Doppler generator 50 includes a register 50-1 coupled to an adder 50-2, an accumulator register 50-2, and a state machine 50-4. FIG. 4b is a state machine diagram for the state machine 50-4 shown in FIG. 4a The output of the generator is a multi-level (e.g., 3 levels) quantized complex phasor (cosine+j*sine). The phase is quantized to 45 degrees. In operation, a desired Doppler value is written over the bus into the register 50-1. The magnitude is added to the accumulator 50-3 at the same rate that words containing four complex samples are read from the sample RAM 44. Whenever the accumulator 50-3 has an overflow condition, the state machine 504 is advanced or retarded one state, depending on the value of the sign bit. The overflow condition represents 45 degrees of accumulated Doppler. In an alternative embodiment, the Doppler generator 50 may be a lookup table (e.g., in ROM) with stored precomputed Doppler shift correction values.

The complex mixing operation is similar to the mixing in the input processing shown in FIG. 1. The input process mixing shifts the code spectrum to zero frequency offset In FIG. 3, mixing shifts the spectrum by a relatively small amount, roughly over a range of 8000 Hz. Thus, there are no more than 8 cycles of complex local oscillator error in a 1 ms segment of 1023 samples.

The value of 8000 Hz of fine Doppler correction is not a hard limit. The particular frequency range depends on the basic signal-to-noise ratio of the input samples and how much margin there is with this value. More particularly, the limitation on the allowed Doppler correction in the matched filter is set by the amount of implementation loss one is willing to accept due to the Doppler shift of the PN code.

The matched filter Doppler correction is only applied to the complex phase of the stored samples. The Doppler of the PN code on the envelope of this phase is not corrected in the matched filter—it is corrected in the processing that is done before the samples are stored by means of the resampling from 137*Fo/32 (44 MHz) down to 2Fo (20.46 MHz) that is controlled by the NCO frequency setting. The reasons for this are as follows:

(1) For simplicity, it is undesirable to have to have a variable PN code rate as PN chips are shifted into the matched filter PN code storage shift register. It is much simpler to have a fixed 2 samples per PN chip.

(2) The Doppler on the PN codes in the stored samples is 1/1540 of the complex phase Doppler because there are 1540 RF cycles for every PN chip. This means that the phase error of the PN code accumulates more slowly that the complex carrier phase error. The phase error in the matched filter must be corrected, but it is generally not necessary to correct the PN Doppler. However, the PN Doppler is not negligible if the initial correction in the resamplers is too far off. At 8000 Hz error, the loss is about 1 dB. This loss results from the phase of the PN in the stored samples shifting with respect to the reference PN chips over the 20 ms integration time. That is, if the reference and the sample PN chips align perfectly at the start of the 20 ms, they will be misaligned by the end of the 20 ms and the misalignment will be enough to cause 1 dB loss if the rate of misalignment is 8000 Hz out of the nominal 1.023 MHz PN chip rate. Similarly, at 16000 Hz Doppler, the loss is about 2 dB. In some applications, there is a lot of signal margin, so that larger offsets would be acceptable. If there are larger offsets and there is inadequate signal margin, then a new set of samples would have to be taken with the initial NCO resampling correction set to a different basic offset, so that a new range of fine Doppler correction is available with appropriately smaller loss.

In the preferred embodiment, both the PN code loading into the code register 46 and the Doppler mixing in mixer 52 are presumed to occur at faster than "real time". Preferably, a clock such as 2Fo would be used. This characteristic is one of the primary advantages of the invention. That is, once data samples have been loaded in real time, subsequent processing can be faster than real time.

When both the PN code and the Doppler-shifted signal samples are loaded into the PN code register 46 and sample register 48, respectively, the correlation process begins. Each complex signal sample is multiplied by its corresponding PN code chip. Note that there are two samples for each code chip, or a pair of half chip spaced correlations for every two samples. All 2046 "multiplies" can be done at once, since the process is only a sign inversion. The resulting products are then input to an adder tree for summation and output as 1 ms of complex coherent integrations. A product/adder circuit 54 performs these functions.

In the preferred embodiment, this output is applied to a conventional envelope generator 56, which calculate the square root of the sum of squares to determine the envelope of the 1 ms waveform. This latter calculation removes problems caused by signal inversions due to the 50 Hz data modulation on the GPS signal.

In the preferred embodiment, the I and Q outputs are further processed by non-coherently combining their envelope through an adder 58 with prior 1 ms correlations for this same PN code phase, previously stored in a RAM store 60. A complete cycle of 20 of such summations is stored in the RAM store 60 for each 20 ms PN code cycle.

After each such pair of half chip spaced correlations, the PN code register 46 is cyclically shifted by 1 chip and the above process is repeated. After 1023 such shifts, all 2046 correlations will have been computed for the current 1 ms segment. At that point, the next 1 ms segment from the sample RAM 44 is Doppler multiplied and loaded into the sample register 48. Thus, the above process is repeated for each of the twenty 1 ms segments stored in the sample RAM 44. After 20 ms have been processed, the output RAM store 60 contains 2046 correlation values.

This whole procedure can be repeated for as many combinations of PN code and Doppler shift as desired. The ultimate correlation search rate depends on the clocking rate. If 2Fo is used as the clocking rate, one PN code/Doppler search would take 2*2046/2FO=0.2 ms, meaning that 5000 searches per second could be performed. Additional time would be taken when ever a new PN code was loaded. To save power, a somewhat lower clock speed can be used. In using the matched filter subsystem 1 to obtain a single GPS position fix, the matched filter subsystem 1 is not used continuously, so average power is low.

The final correlation values in the RAM store 60 may be made available over the external bus 4 for further processing by other systems. The matched filter subsystem 1 may then generate an interrupt to an external signal processor, which can read out the results of the correlation process. In the simplest case, the desired result may be just the maximum value and its code phase (location in the RAM store 60). However, in other cases, additional information may be required that is different for various applications. For example, samples adjacent to the maximum value can be used to provide information about the likelihood of the peak being a cross correlation signal. Smaller peaks at earlier phases may indicate a partially blocked line-of-sight path. The three or four adjacent peaks of a maximum peak can be used to better define the optimum location of the true correlation peak. Thus, if the correlation array in the RAM store 60 is made accessible to by means of the external bus 4, the output interface can be made general and the need for more complex sorting or other algorithms in the hardware is eliminated.

In an alternative embodiment, the matched filter subsystem 1 may provide a specialized search function 62 that automatically provides, for example, the largest correlation value or values (e.g., 8 largest peaks) and the corresponding location (code phase) in the array of 2046 non-coherent sum values after all twenty segments have been processed.

Basic Cell of Matched Filter

Figure 5A:
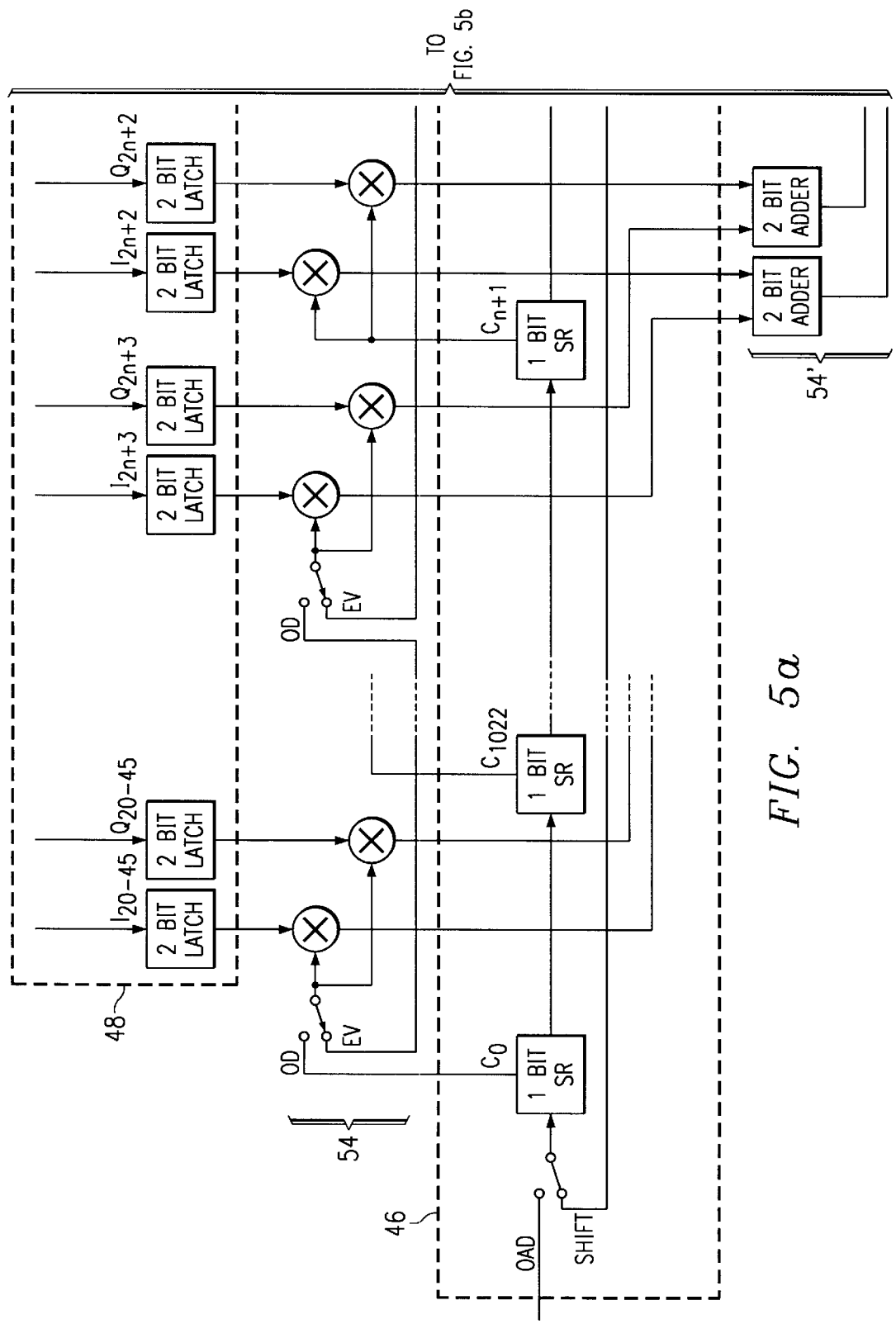
FIG. 5 is a logic diagram for one embodiment of the register and summing circuitry of the matched filter shown in FIG. 3.
Figure 5B:
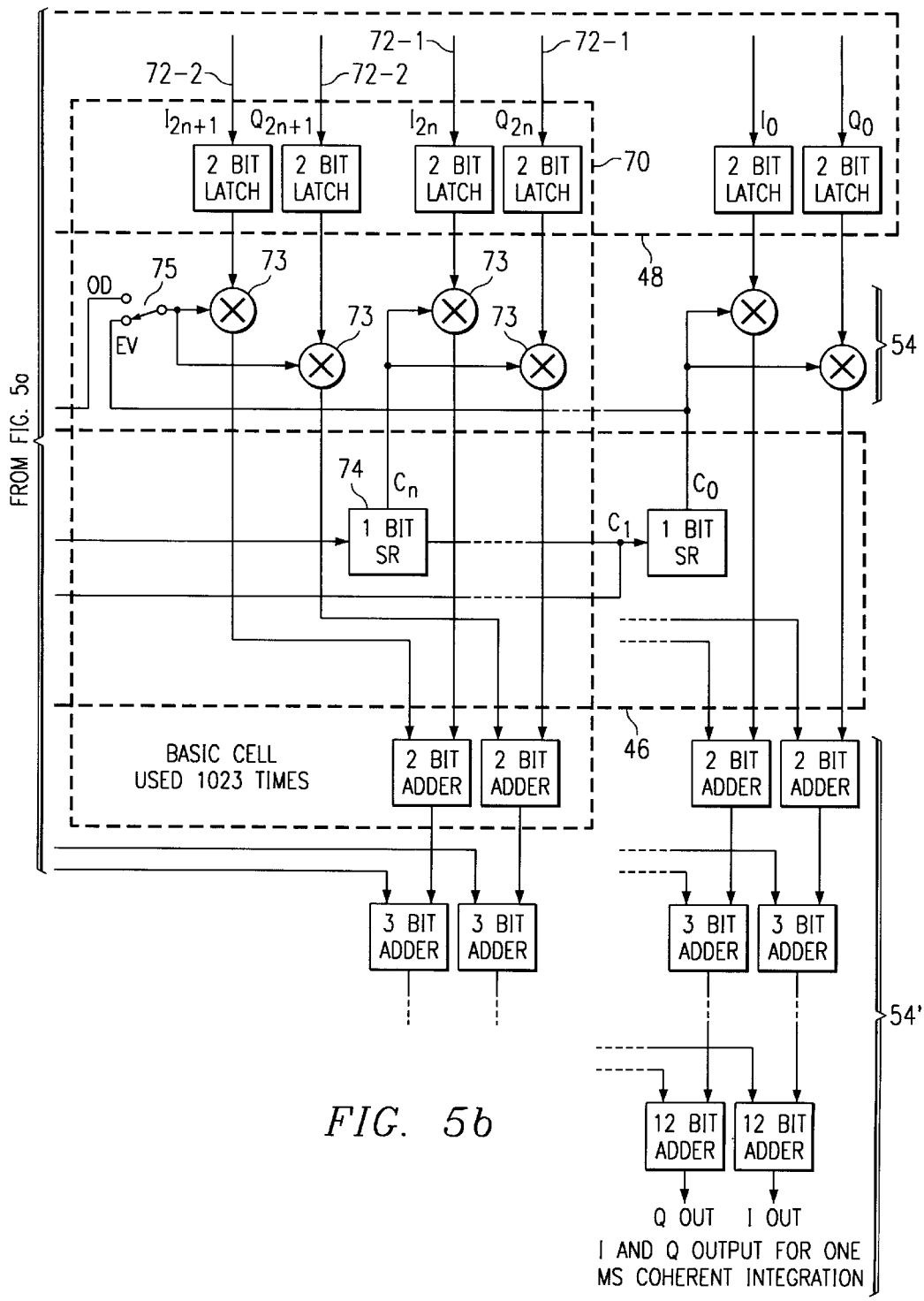

FIG. 5 is a logic diagram for one embodiment of the register and summing circuitry of the matched filter shown in FIG. 3. A basic cell 70 may be defined as including: two pairs 72-1, 72-2 of I and Q latches for storing input I and Q data samples each represented as two bit quantities that can only take on the values $-1$, $0$ and $+1$; corresponding one bit multipliers 73 for applying the PN chips as one bit quantities that take on the values $-1$ and $+1$, hence, the "multipliers" only have the effect of changing the sign bit of the I and Q data values; a corresponding 1 bit shift register PN chip stage 74; and an odd-even switch 75 between cells 70 that allows each PN chip stage 74 to be applied to successive pairs of I and Q latches without shifting the PN code each time, thus saving power (ie., this feature saves 1023 shift register stages and the power associated with making extra shifts).

The outputs of the multipliers 73 are coupled to an adder tree 54', which hierarchically adds all of the 2046 stages until final I and Q sums are output. The adder tree 54' shown in FIG. 5 has 12 bit adders as the final stage. However, the width of the adders can likely be reduced after a few stages, possibly at the expense of implementing a saturating addition.

Because the data widths involved in the basic cell 70 are small, the register and summing circuitry can be implemented in relatively few gates.

Programming and Control

In the preferred embodiment, the matched filter subsystem 1 is envisioned as an independent subsystem that is controlled by a microprocessor. The degree of autonomy required of the matched filter subsystem 1 depends primarily on its speed of operation. If the time required to search one code/Doppler bin is on the order of 10–20 ms, then the most likely mode of operation would be for the microprocessor to issue a command to do a load or search, have the matched filter subsystem 1 execute that command, and then have the microprocessor collect the results and issue a command for the next operation, if there is one. Alternatively, if the matched filter subsystem 1 is operated at very high speed, such as the 5000 one-millisecond segment searches per second mentioned above, it would likely be required that a sequence of commands be issued and that the matched filter subsystem 1 have an automated method, such as a direct memory access (DMA) capability, of delivering results to the microprocessor.

After the microprocessor has read out all of the data required for the particular operation it is performing with the matched filter subsystem 1, the microprocessor can issue the next command, if there is one. Thus, the matched filter subsystem 1 can operate asynchronously, as rapidly as the microprocessor can process its output results.

When the invention is used to acquire the position of a GPS satellite, the objective for the matched filter subsystem 1 during initial acquisition is to get enough satellites in track to support navigation within one second. Because of the inexpensive frequency standard technology used, this requirement can require searching 10–20 Doppler bins until the first satellite is acquired. In cold start conditions, it may be necessary to search for 2–3 satellites before a satellite that is visible is picked. Therefore, it is necessary to be able to search 50 to 100 Doppler bins per second to meet this objective. This search rate is consistent with allowing a current-technology microprocessor to control the matched filter subsystem 1 one command at a time.

Accordingly, under these assumptions, the command set for the matched filter subsystem 1 may be relatively simple. The following commands would be easy to implement:

LOAD SIGNAL SAMPLES: At the beginning of the next T20 interval, the matched filter subsystem 1 would begin loading 20 ms of signal samples.

INPUT FREQUENCY: A register is required to specify the nominal frequency shift to use while the signal samples are loaded. Assuming reuse of the carrier and code NCO and generation circuits 24, 26, this interface can be based on those designs.

EXECUTE SEARCH: The matched filter subsystem 1 would immediately execute a correlation search based on the programmed search parameters.

Search parameter registers could be programmed to store the following values:.

Doppler SHIFT: This is a Doppler shift applied to the stored signal as each 1 ms segment is loaded into the sample register 48. For example, there may be on the order of 16 or so Doppler values, representing shifts of 750*n Hz, where n=0 . . . 15.

PN CODE: This register would likely be used in association with the existing code NCO and generator 24. The new function would be to inform the matched filter subsystem 1 that a new PN code is required, so that the code would be generated and loaded into the code register 46 for use in the next, and subsequent, correlation searches.

Program Implementation

For performance purposes with current technology, the preferred embodiment of the invention is principally implemented in dedicated circuitry. However, the functions performed by the invention may also be implemented in generalized programmable circuitry capable of generating the following steps:

(1) Receive and store an input sample of a complex signal to be Doppler shift corrected and correlated to a code signal; optionally limit the received complex signal in value range and/or sampling frequency.

(2) Complex mix at least a portion of the stored input sample with a Doppler shift correction value.

(3) Compute the complex products of the mixed portion of the stored input sample with a current code phase of the code signal.

(4) Sum the computed complex products as a current complex integration value.

(5) Compute (and normally store) the square root of the sum of the squares of the current complex integration value.

(6) Shift the code signal to a next current code phase.

(7) Repeat steps (3) through (6) for the current code phase of the code signal.

(8) Output the code phase and magnitude of the stored computed square root value having the largest magnitude as an indication of correlation between the input sample and the code signal, corrected for Doppler shift.

Following is a pseudocode version of one embodiment of a matched filter processor in accordance with the invention:

```
// Matched Filter Algorithm Pseudocode
// This version assumes that the samples are loaded with the
// digital IF Of/8 plus the nominal estimated frequency error
// already removed. The complex spectrum is then centered
// near zero Hz. Further complex frequency shifts will be made
// to search other Doppler bins. The IF has to be removed before
// the sample rate is reduced from 20/Tca to 2/Tca. The analog
// bandwidth is a little too wide for this sampling rate. It has
// to be verified that the PN waveform is as tolerant as expected
// to the resulting aliasing.
// ******** Load the matched filter ********
```

-continued

```
// This operation is real time, in the sense that the samples are
// being created by a clock that has to sample uniformly in time.
// So, these samples have to be stored as fast as they are received.
// Subsequent processing in the MF can be non-real time (either
// faster or slower).
#define SAMPLES_PER_MS (2046)  // Sampling at 2/Tca 2.046 MHz
#define NUMBER_OF_MS (20)
// The signal samples are complex values (I,Q). Each component,
// in-phase or quadrature, can take on three values: -1, 0, +1. In the
// hardware before the MF, these samples are represented by two bits each
// for I and Q
int s[NUMBER_OF_MS][SAMPLES_PER_MS][2];
int ij;
for(i=0;i<NUMBER_OF_MS;i++)           // each one ms segment
{
    for(j = 0; j <SAMPLES_PER_MS; j++)  // each complex sample in the ms
    {
        s[i][1][0]= Get_1_Phase_Sample();  // three-valued, two bit I sample
        s[i][1][1]= Get_Q_Phase_Sample();  // three-valued, two bit Q sample
    }
}
// ******* Load GPS PN Code ***************
// GPS PN codes could be generated as needed by code generator (re-use design
// from signal processor channels). Alternatively, they could be stored in a ROM.
// Each chip is one bit representing the values -1 and +1.
#define CHIPS_IN_CODE (1023)     // periodic length of GPS PN codes
#define NUMER_OF_CODES (32)      // number of GPS codes (ignoring pseudolites
                                 // and WAAS codes)
int c[NUMER_OF_CODES][CHIPS_IN_CODE];  // Assume ROM storage notation.
// ******* Load Doppler Signal ***************
// The notation here assumes that the complex signals to mix the various Doppler values
// to dc are stored in a ROM as complex values. That is not a likely implementation,
// but makes the math easier to visualize. The values are assumed to be 5 level signals
// like the normal signal processing channels use. Most likely, the generator used
// in the normal signal processing channels could be used as a starting point. Simpler
// implementations using two level quantization (-1 ,+1) are likely.
#define NUMBER_OF_DopplerS(16)
int d[NUMBER_OF_DopplerS][SAMPLES_PER_MS][2];
// ******* Run the Matched Filter **********
// This version assumes that as each segment is loaded from RAM into a 1 ms long latch
// for correlation with the PN code, the Doppler signal is applied.
int code;         // which pn code is being processed
int sample;       // which sample is being processed
int shift;        // which of the code phases is being processed
int half_shift;   // because there are two samples per chip
int seg;          // which one ms signal segment is being processed
int dop;          // which Doppler bin is being processed
int chip;         // which chip is being processed
int r_ms          // ms accumulator, real part
int i_ms          // ms accumulator, imaginary part
int sum_20ms[SAMPLES_PER_MS];    // 20 ms non-coherent accumulators
int s_1ms[SAMPLES_PER_MS][2];    // Current 1 ms of Doppler shifted signal
#define RE (O)
#define IM (1)
// here we are showing that all codes, Dopplers and phase shifts are processed.
// We may want to be able to select a sub-range, list, or single one of these.
// There are probably some command registers to specify ranges & modes of operation.
for( code = 0; code <NUMER_OF_CODES ; code++) // process each code
{
    for( dop = 0; dop <NUMBER_OF_DopplerS; dop++) // process each Doppler shift
    {
        for( seg = 0; seg <NUMBER_OF_MS; seg++) // process each ms
        {
            for( sample = 0; sample <SAMPLES_PER_MS; sample++) // do Doppler shift while loading 1 ms
signal register
            {
                s_1ms[sample][RE]= d[dop][sample][RE]* s[seg][sample][RE]-d[dop][sample][IM]*
                        s[seg9 [sample][IM];
                s_1ms[sample][IM]= d[dop][sample][IM]* s[seg][sample][RE]+d[dop][sample][RE]*
                        s[seg][sample][IM];
            }
            for( shift = 0; shift <CHIPS_IN_CODE; shift++) // process each phase shift of the code
            {
                half_shift = 2 * shift;
                for( half_chip = 0; half_chip <2; half_chip++) // two samples per chip
                {
                    if(seq = 0) // zero the 2046 non-coherent 20 ms integrator on first segment
                    {
                        sum_20ms[half_shift + half_chip] = 0;
```

-continued

```
        }
        r_20ms = 0; // zero the coherent 1 ms integrators
        i_20ms = 0;
        for( sample = 0; sample <SAMPLES_PER_MS; sample++) // form 1 ms sums
        {
            chip = (sample + half_chip) // stays the same for two consecutive samples
            // The sum can change only by -2, -1, 0, +1, or +2 at each pass
            // There is a way to use 5 level (rather than 3 level) Doppler signals and still have only
            // these change values. This results in less implementation loss of C/No.
            // The last half chip of the last sample might just be skipped, if it helps.
            r_ms += c[code][(shift+chip)%CHIPS_IN_CODE] * (s_1ms[sample][RE]);
            i_ms += c[code][(shift+chip)%CHIPS_IN_CODE] * (s_1ms[sample][IM]);
        }
        // The sort of the sum of squares (envelope) can be approximated by:
        // max_abs = MAX( |r_ms|, |i_ms|);
        // min_abs = MIN( |r_ms|, |i_ms|);
        // sum_20ms = max_abs + min_abs/2;
        sum_20ms[half_shift + half_chip] += sqrt(r_ms * r_ms+ i_ms * i_ms);   // exact value of envelope
      } // end of half chip
     } // end of code shift
    } // end of 1 ms segment
    // The 20 ms second sums for this code and Doppler are complete.
    // Alternatives at this point include
    // 1. Interrupt processor to inspect 20 ms sums
    //    (a lot of throughput, but might want in case of limited search).
    // 2. Hardware search for N largest values and their locations; store for processor.
    // 3. Hardware search for largest value and its location. Store for processor. May not be adequate.
    // 4. Store every value and location above a threshold. Store for processor.
    // 5. Hardware search for largest value. Store value and location for processor. Interrupt processor and
    // halt the MF until re-enabled by processor. Then continues with next search.
    // Below shows illustration for largest value.
    Ma_Loc = -1;
    MaxVal = -1;
    for(sample = 0; sample <SAMPLES_PER_MS; sample++)
    {
        if(sum_20ms[sample]>MaxVal)
        MaxVal = sum_20ms[sample];
        MaxLoc = sample;
    }
    // Interrupt processor. Processor has until next start of search to get results.
    // Might want to have a mode that suspends until interrupt is acknowledged.
    // This would be useful if the processor were going to search the 20 ms sums itself or
    // extract some other data.
    Interrupt(MF_Complete);
   } // end of one Doppler bin
 } // end of one pn code choice
 MF_Idle(); // Go to sleep. No clocks, no/low power.
```

A number of embodiments of the present invention have been described. Nevertheless, it will be understood that various modifications may be made without departing from the spirit and scope of the invention. Accordingly, other embodiments are within the scope of the following claims.

What is claimed is:

1. A method for implementing a spread spectrum matched filter with Doppler correction, including the steps of:
   (a) receiving an input sample of a complex signal to be Doppler shift corrected and correlated to a code signal;
   (b) complex mixing at least a portion of the input sample with a Doppler shift correction value;
   (c) computing complex products for the mixed portion of the input sample with a current code phase of the code signal;
   (d) summing the computed complex products as a current complex integration value;
   (e) computing the square root value of the sum of the squares of the current complex integration value, each square root value having a magnitude and an associated code phase;
   (f) shifting the code signal to a next current code phase;
   (g) repeating steps (c) through (f) for the current code phase of the code signal;
   (h) outputting the code phase and magnitude of the computed square root value having the largest magnitude as an indication of correlation between the input sample and the code signal, corrected for Doppler shift.

2. The method of claim 1, further including the step of limiting the received complex signal in value range.

3. The method of claim 1, further including the step of limiting a sampling frequency for the received complex signal.

4. The method of claim 3, further including the step of applying band limiting filtering before the step of limiting a sampling frequency for the received complex signal.

5. The method of claim 1, wherein each computed square root value is stored.

6. A circuit for implementing a spread spectrum matched filter with Doppler correction, the circuit including:
   (a) a storage circuit configured to receive and store an input sample of a complex signal to be Doppler shift corrected and correlated to a code signal;
   (b) a Doppler shift generator for generating a Doppler shift correction value;
   (c) a complex mixer, coupled to the storage circuit and the Doppler shift generator, for mixing at least a portion of the input sample with a Doppler shift correction value from the Doppler shift generator;

(d) a complex product generation circuit, coupled to the complex mixer and a code signal input, for computing the complex product of the mixed portion of the input sample with a current code phase of the code signal;

(e) a summing circuit, coupled to the complex product generation circuit, for summing the computed complex products as a current complex integration value;

(f) a square root circuit, coupled to the summing circuit, for computing the square root value of the sum of the squares of the current complex integration value, each square root value having a magnitude and an associated code phase;

(g) an output processing circuit, coupled to the square root circuit, for processing a plurality of computed square root values, wherein the code phase and magnitude of the computed square root value having the largest magnitude indicates a correlation between the input sample and the code signal, corrected for Doppler shift.

7. The circuit of claim 6, further including a limiting circuit for limiting the received complex signal in value range.

8. The circuit of claim 6, further including a limiting circuit for limiting a sampling frequency for the received complex signal.

9. The circuit of claim 8, further including a band limiting filter coupled before the limiting circuit.

10. A computer program, residing on a computer-readable medium, for implementing a spread spectrum matched filter with Doppler correction, the computer program comprising instructions for causing a computer to:

(a) receive an input sample of a complex signal to be Doppler shift corrected and correlated to a code signal;

(b) complex mix at least a portion of the input sample with a Doppler shift correction value;

(c) compute complex products for the mixed portion of the input sample with a current code phase of the code signal;

(d) sum the computed complex products as a current complex integration value;

(e) compute the square root value of the sum of the squares of the current complex integration value, each square root value having a magnitude and an associated code phase;

(f) shift the code signal to a next current code phase;

(g) repeat the instructions implementing functions (c) through (f) for the current code phase of the code signal;

(h) output the code phase and magnitude of the computed square root value having the largest magnitude as an indication of correlation between the input sample and the code signal, corrected for Doppler shift.

11. The computer program of claim 10, further including instructions for causing a computer to limit the received complex signal in value range.

12. The computer program of claim 10, further including instructions for causing a computer to limit a sampling frequency for the received complex signal.

13. The computer program of claim 12, further including instructions for causing a computer to apply band limiting filtering before limiting a sampling frequency for the received complex signal.

14. The computer program of claim 10, wherein each computed square root value is stored.

* * * * *